United States Patent [19]

Uchino et al.

[11] Patent Number: 4,883,248
[45] Date of Patent: Nov. 28, 1989

[54] SHOCK PREVENTING APPARATUS

[75] Inventors: Kenji Uchino, Yokohama; Kazumasa Ohnishi, Nagaoka, both of Japan

[73] Assignee: Alps Electric Co., Ltd., Tokyo, Japan

[21] Appl. No.: 244,891

[22] Filed: Sep. 15, 1988

[30] Foreign Application Priority Data

Jan. 22, 1988 [JP] Japan .................................. 63-12082

[51] Int. Cl.$^4$ ............................................. F16F 15/00
[52] U.S. Cl. ..................................... 248/550; 248/638
[58] Field of Search ............... 248/550, 562, 638, 636; 267/136, 140.1

[56] References Cited

U.S. PATENT DOCUMENTS

| | | | |
|---|---|---|---|
| 2,964,272 | 12/1960 | Olson | 248/550 |
| 4,240,141 | 12/1980 | Vasiliev et al. | 248/638 |
| 4,615,504 | 10/1986 | Sandercock | 248/550 |
| 4,643,385 | 2/1987 | Sandercock | 248/550 |

Primary Examiner—Alvin C. Chin-Shue
Attorney, Agent, or Firm—Guy W. Shoup; Paul J. Winters; Gideon Gimlan

[57] ABSTRACT

In a vibration preventing apparatus, there are provided a supporting plate on which an object to be supported is mounted; and a member fixed on the supporting plate, for supporting the supporting plate. In this apparatus, a piezoelectric effect element, to which electrodes a resistor is connected, is attached to a surface of the supporting plate. This piezoelectric effect element is a bimorph.

14 Claims, 4 Drawing Sheets

SHOCK PREVENTING APPARATUS

BACKGROUND OF THE INVENTION

1. Field of the Invention

The present invention relates to a shock preventing apparatus for a microscopy or the like.

2. Description of the Related Art

A shock preventing apparatus of this kind, having such a construction as shown in FIG. 7 is utilized in the conventional technical field.

In FIG. 7, reference numeral 1 denotes a supporting plate, on which surface an object to be supported 3 is mounted. Reference numeral 2 indicates an elastic member fixed on a rear surface of the supporting plate 1, and supports the supporting plate 1, on which the object to be supported 3 is mounted, on a floor surface 4.

In this shock preventing apparatus having such a construction, when vibrations are transported to the floor surface 4, these vibrations are attenuated by the elastic member 2 which prevents the vibrations from being transported to the object to be supported 3.

However, the vibration attenuation by the above-described conventional shock preventing apparatus is not so sufficient. Moreover, a long time period is required to sufficiently attenuate the vibrations transported to the supporting plate 1. As a result, the satisfactory shock preventing effect cannot be achieved.

The present invention has been therefore made to solve the above-described problems of the conventional shock preventing apparatus, and has an object to provide a shock preventing apparatus capable of quickly attenuating the vibrations which are transported from the floor surface and of representing the better shock preventing effect.

SUMMARY OF THE INVENTION

To this end, the shock preventing apparatus according to the invention is characterized by comprising a supporting plate on which an object to be supported is mounted, and a member fixed on said supporting plate, for supporting said supporting plate, wherein a piezoelectric effect element to which electrodes a resistor is connected is attached to said supporting plate's surface.

According to the above-described shock preventing apparatus of the invention, when the vibrations are transported to the floor surface, these vibrations are transferred via the elastic member to the supporting plate and also the piezoelectric effect element attached to this supporting plate. Both the supporting plate and piezoelectric effect element vibrate. An electric charge is generated at the electrode of the piezoelectric effect element due to this vibration. Then, this electric charge is discharged through the resistor. At this time, the vibration energy of the piezoelectric effect element is consumed in the resistor as the electric energy, so that the vibrations of the piezoelectric effect element can be attenuated. In connection with this effect, the vibrations of the supporting plate on which the piezoelectric effect element has been attached can be also attenuated.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENTS

Figure 1:
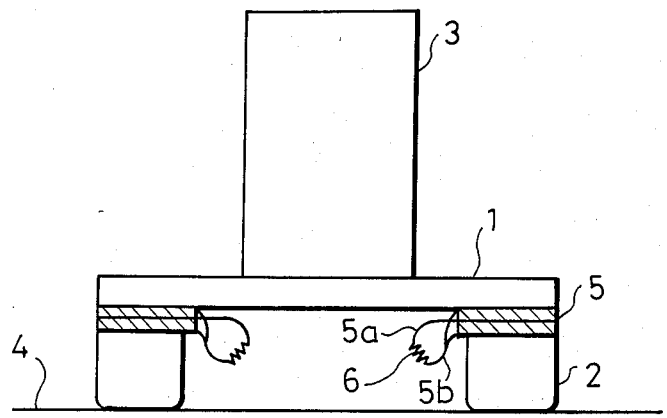
FIG. 1 schematically shows a construction of the shock preventing apparatus according to one preferred embodiment of the invention.

Referring now to the drawings, one preferred embodiment of the invention will be described.

Figure 7:
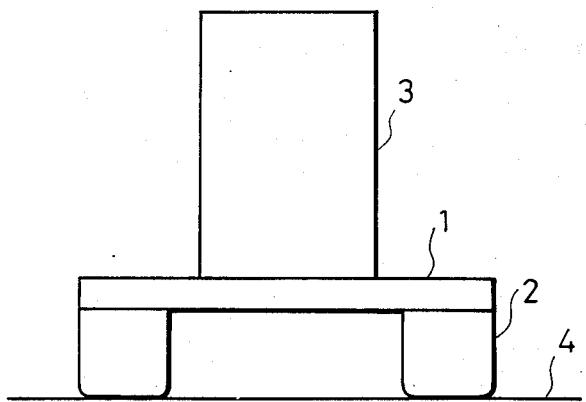

FIG. 1 schematically illustrates a construction of the shock preventing apparatus according to one preferred embodiment of the invention. It should be noted that the same reference numerals employed in FIG. 1 denote the same or similar components shown in FIG. 7, and the explanations thereof are omitted.

In FIG. 1, reference numeral 5 indicates a bimorph which is attached on a mounting portion of an elastic member 2 positioned on a rear surface of a supporting plate 1. Reference numeral 6 represents a resistor both ends of which are connected to electrodes 5a and 5b of the bimorph 5.

Figure 2:
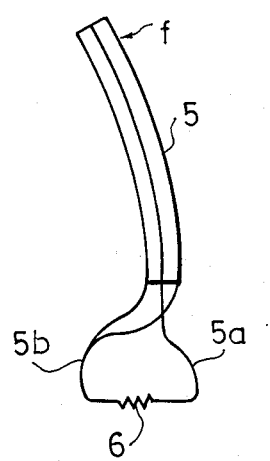
FIG. 2 schematically illustrates a construction of the bimorph and resistor employed in the above-described preferred embodiment.

FIG. 2 schematically illustrates a construction of the bimorph 5 and resistor 6 employed in the preferred embodiment. As shown in FIG. 2, when external force "f" is applied to the bimorph 5, this bimorph 5 is bent toward the application direction of the external force. As a result, an electric charge is produced between the electrodes 5a and 5b of the bimorph 5. Thereafter, when the application of this external force "f" is interrupted, residual vibrations are produced at the bimorph 5. As a result, an alternating voltage is produced between the electrodes 5a and 5b of the bimorph 5 in response to the residual vibrations. When, the electric charge generated between the electrodes 5a and 5b is discharaged through the resistor 6 and a Joule heat is produced at the resistor 6. At this time, the vibration energy of the bimorph 5 is consumed at the resistor 6 in the form of the Joule heat, so that the vibrations of the bimorph 5 are attenuated. In other words, since the resistor 6 is connected to the bimorph 5, the vibration suppression effect can be established in this bimorph 5 for the residual vibrations thereof.

The shock preventing apparatus shown in FIG. 1 utilizes the above-described characteristics of the bimorph, and operations thereof will now be described. When vibrations are produced at the floor surface 4, they are transported via the elastic member to the bimorph 5 which is attached to the supporting plate 1. Due to occurence of the vibrations, the electric charge is generated between the electrodes 5a and 5b of the bimorph 5. However, this generated electric charge is discharged through the resistor 6. At this time, the vibration energy of the bimorph 5 is consumed by the resistor 6 as the electric energy, with the result that the vibrations of the bimorph 5 are attenuated. As a consequence, the vibrations of the supporting member 1 attached to the bimorph 5 are also attenuated.

A description will now be made of a relationship between the resistance value of the resistor 6 and the vibration suppression effect of the residual vibration of the bimorph 5 shown in FIG. 2. In FIG. 2, when the resistance value of the resistor 6 is varied, the Joule heat generated in the resistor 6 is accordingly changed. If the resistance value of this resistor 6 is so set as to achieve the maximum Joule heat, then the optimum vibration suppression effect can be realized.

Figure 3:
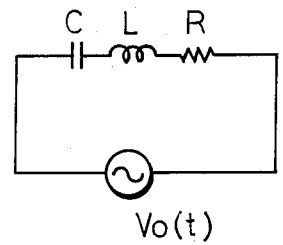
FIG. 3 is an equivalent circuit diagram of the bimorph and resistor of FIG. 2.

FIG. 3 is an equivalent circuit diagram of the bimorph 5 and resistor 6 shown in FIG. 2. In this FIG., a symbol "C" represents an electrostatic capacitance of the bimorph 5, another symbol "L" denotes an inductance of the bimorph 5, a symbol "R" is a resistance value of the resistor 6, and a symbol "Vo(t)" represents an alternating voltage produced in the bimorph 5 due to the residual vibrations. If an angular frequency of the alternating voltage Vo(t) is assumed as "Ω", an impedance "Z" of this circuit will be expressed in the following equation:

$$Z = \left( R^2 + \left( \omega L - \frac{1}{\omega C} \right)^2 \right)^{\frac{1}{2}} \quad (1)$$

Then, the Joule heat "W" consumed in the resistor 5 will be expressed in the following equation:

$$W = \frac{V_0^2}{Z^2} R$$

$$= V_0^2 / \left( R + \frac{1}{R} \left( \omega L - \frac{1}{\omega C} \right)^2 \right) \quad (2)$$

In the above equation (2), when the denominator of this fraction becomes minimum, the Joule heat becomes maximum. That is to say, when the resistance value of the resistor 6 is expressed by the value of the following equation, the denominator of the above equation (2) becomes minimum and therefore the Joule heat "W" consumed in the resistor 5 becomes maximum.

$$R = \left| \omega L - \frac{1}{\omega C} \right| \quad (3)$$

In general, the frequency of the residual vibrations is on the order of 300 Hz, the electrostatic capacitance "C" of the bimorph 5 is approximately 60 nF, and the inductance component "L" is negligible small. When these conditions are given to the equation (3), the resistance "R" of the resistor 6 is equal to 8.8kΩ. In other words, if the resistance value of the resistor 6 is set to be on the order of 8.8 kΩ, the maximum vibration suppression effect of the bimorph 5 may be expected.

Figure 4:
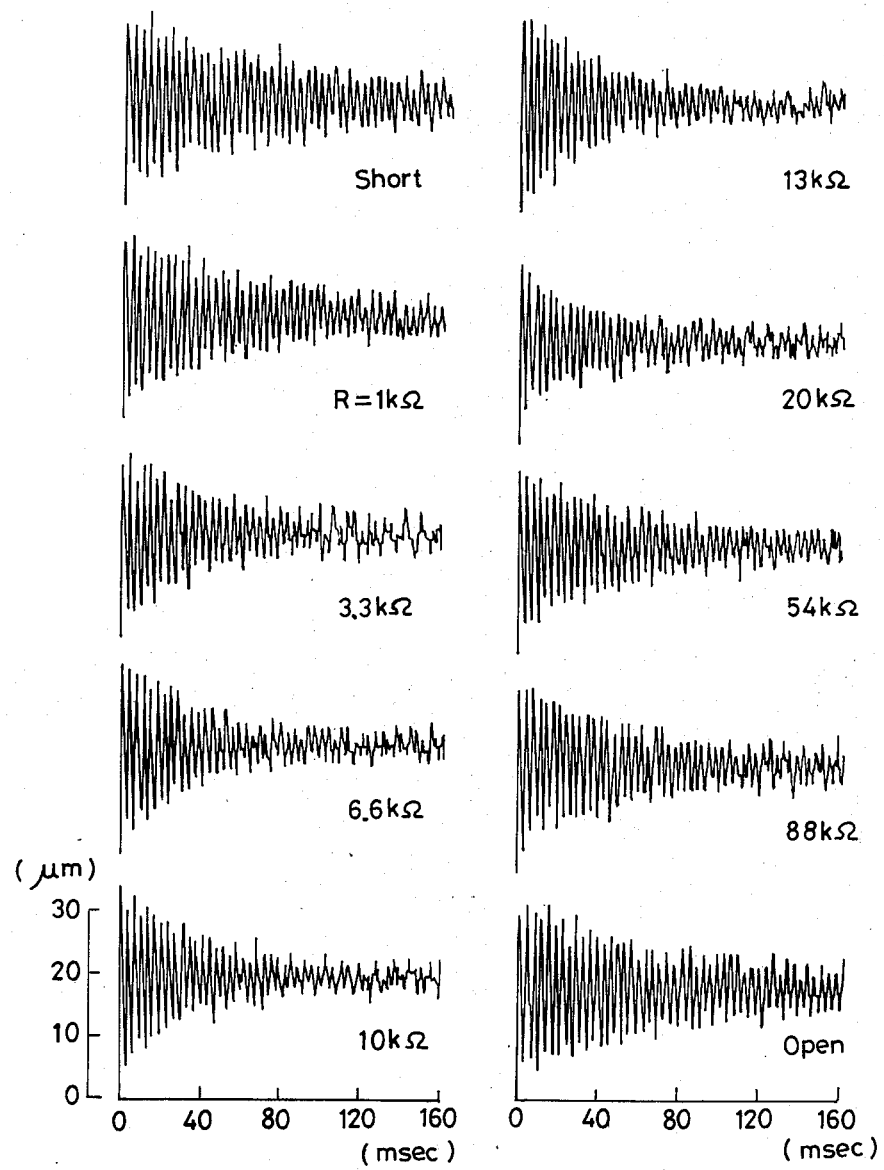
FIG. 4 shows residual vibration waveforms of the bimorph to which external vibrations are applied under the condition that the resistance values of the resistor shown in FIG. 2 are set to various values.
Figure 5:
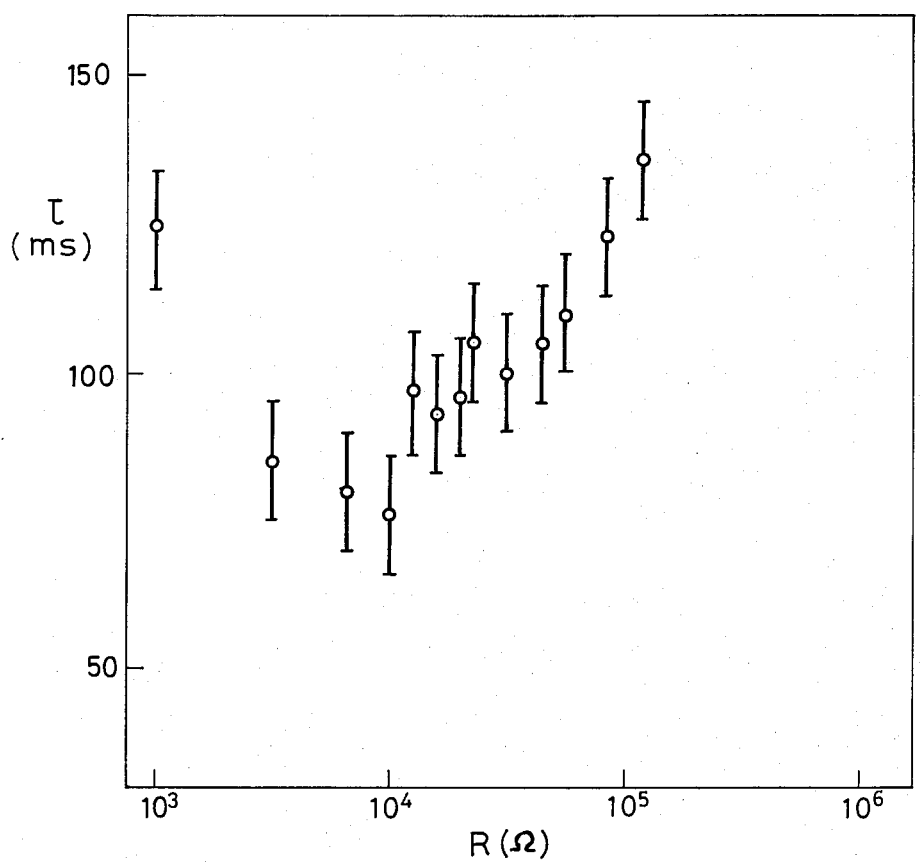
FIG. 5 shows a relationship between the attenuation time constant of the respective residual vibration waveforms represented in FIG. 4 and the resistance values of the resistor.

FIG. 4 represents the results of the residual vibration waveforms which are obtained by setting various resistance values of the resistor 6 in FIG. 2 and applying the external force to the bimorph 5. FIG. 5 is a graphic representation of the relationship with the resistance R and a time constant "τ" which is obtained from the residual vibration waveforms shown in FIG. 4 at the amplitude attenuation. As apparent from these drawings, it can be understood from the above-described assumption that the time constant of the attenuation becomes minimum when the resistance value of the resistor 6 is about 6.6 kΩ to 10 kΩ, and also the vibration suppression effect of the bimorph 5 becomes maximum.

As has been described, by connecting the resistor 6 to the bimorph 5, the vibration suppression effect of the bimorph 5 can be increased. Also, if the resistance value of the resistor 6 is fitted to the internal impedance of the bimorph 5, it is obvious that the vibration suppression effect of the bimorph 5 can become maximum. As a consequence, when the resistor having the proper resistance value is connected to the bimorph, and this bimorph is attached to the supporting plate of the vibration preventing apparatus, the vibration preventing effect of the vibration preventing apparatus can be increased.

Figure 6:
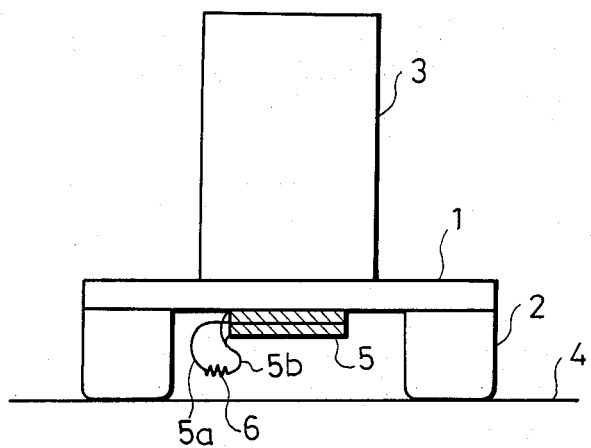
FIG. 6 schematically shows a construction of the shock preventing apparatus according to a second preferred embodiment of the invention; and, FIG. 7 schematically shows a construction of the conventional shock preventing apparatus.

FIG. 6 schematically shows another construction of the vibration preventing apparatus according to a second preferred embodiment of the invention. As illustrated in this FIG., even if the bimorph 5 is attached to the portion other than the mounting portion of the elastic member 2, the vibrations transported to the supporting plate 1 can be quickly suppressed, as is similar to that of the first preferred embodiment as described above.

While the present invention has been described in detail, since the piezoelectric effect element to which electrodes the resistor is connected, is attached on the surface of the supporting plate of the vibration preventing apparatus, the vibration suppression effect of the vibration preventing apparatus can be considerably improved.

What is claimed is:

1. A vibration preventing apparatus comprising:
    a supporting plate on which an object to be supported is mounted; and
    a member fixed on said supporting plate, for supporting said supporting plate, wherein:
    a piezoelectric effect element, to which electrodes a resistor having a predetermined resistance is connected, wherein the resistance of the resistor is selected such that a substantial amount of vibration energy received by the piezoelectric effect element is converted to heat energy, the piezoelectric effect element being attached to a surface of said supporting plate.

2. A vibration preventing apparatus as claimed in claim 1, wherein said piezoelectric effect element is a bimorph.

3. A vibration preventing apparatus as claimed in claim 1, wherein said piezoelectric effect element is a bimorph, having a capacitance of approximately 60nF, and said resistor has a resistance of approximately 8.8 kΩ.

4. A shock attenuating apparatus comprising:
    a body through which vibration energy may be transferred,
    a piezoelectric effect element coupled to the body for receiving and converting at least a portion of the vibration energy transferred through the body to electrical energy; and
    a resistor having a predetermined resistance operatively coupled to the piezoelectric effect element, to convert the electrical energy generated by the piezoelectric effect element to heat energy, wherein the resistance of the resistor is selected such that a substantial amount of the vibration energy received by the piezoelectric effect element is converted into heat energy.

5. A shock attenuating apparatus according to claim 4, wherein the resistance of the resistor is selected to maximize the amount heat energy produced by the resistor.

6. A shock attenuating apparatus according to claim 4 wherein the resistance of the resistor is set at least approximately according to the formula:

$$R = \left| \omega L - \frac{1}{\omega C} \right|$$

where:
R = resistance of the resistor
$\omega$ = angular frequency of an alternating voltage component produced by the piezoelectric effect element
C = capacitance of the piezoelectric effect element,
L = inductance of the piezoelectric effect element.

7. A shock attenuating apparatus according to claim 6, wherein the piezoelectric effect element is a bimorph.

8. A shock attenuating apparatus according to claim 4, wherein the piezoelectric effect element is a bimorph.

9. A shock attenuating apparatus according to claim 4, wherein the piezoelectric effect element has a capacitance of approximately 60nF and the resistor has a resistance of between 6.6k$\Omega$ and 10k$\Omega$.

10. A shock attenuating apparatus according to claim 4, wherein the piezoelectric effect element outputs an electrical signal component having a frequency on the order of 300Hz.

11. A shock attenuating apparatus according to claim 4, wherein the piezoelectric effect element has a capacitance of approximately 60nF and the resistor has a resistance between 1k$\Omega$ and 88k$\Omega$.

12. A shock attenuating apparatus comprising:
first energy conversion means for receiving the energy of mechanical vibrations and converting the same to electrical energy; and
second energy conversion means, operatively coupled to the first means, for converting electrical energy produced by the first means into heat energy;
wherein the first and second means are matched to maximize, at least approximately, the amount of mechanical energy that is converted to heat energy.

13. The shock attenuating apparatus of claim 12 wherein the first means comprises a piezoelectric effect element.

14. The shock attenuating apparatus of claim 13 wherein the second means comprises a resistor.

* * * * *